United States Patent
Babatz et al.

(10) Patent No.: US 6,237,987 B1
(45) Date of Patent: May 29, 2001

(54) OPENING SYSTEM FOR A MOVABLE VEHICLE BODY PART OF A MOTOR VEHICLE

(75) Inventors: Udo Babatz; Rudi Kölle, both of Sindelfingen; Martin Lindmayer, Sulz; Wolfram Schröder, Wildberg; Alfred Stauber, Böblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/499,457

(22) Filed: Feb. 7, 2000

(30) Foreign Application Priority Data

Feb. 25, 1999 (DE) .............................. 199 08 103

(51) Int. Cl.$^7$ ...................................... B60J 5/00
(52) U.S. Cl. ........................... 296/146.6; 296/188
(58) Field of Search ................ 296/146.6, 146.1, 296/188, 189, 146.9; 49/503, 502

(56) References Cited

U.S. PATENT DOCUMENTS

| | | |
|---|---|---|
| 4,800,638 * | 1/1989 | Herringshaw et al. ....... 296/146.6 X |
| 5,377,450 * | 1/1995 | Varajon ..................... 296/146.7 X |
| 5,553,910 | 9/1996 | Park ............................ 296/188 |
| 6,065,797 * | 5/2000 | Shirasaka .................... 296/146.6 |

FOREIGN PATENT DOCUMENTS

| | | | |
|---|---|---|---|
| 405169974 * | 7/1993 | (JP) ................ 296/146.6 |
| 406191276 * | 7/1994 | (JP) ................ 296/146.6 |
| 10-181350 | 7/1998 | (JP) . |

* cited by examiner

Primary Examiner—Joseph D. Pape
(74) Attorney, Agent, or Firm—Evenson, McKeown, Edwards & Lenahan, P.L.L.C.

(57) ABSTRACT

An opening system for a movable passenger motor vehicle body part, such as a door, has lock which is arranged on an inner shell of the vehicle body part and can be operated by an outside handle arrangement, which is fixed on an outer shell of the vehicle body part. A deformation-resistant supporting arrangement is provided at the level of the outer handle arrangement on a side of the inner shell of the vehicle body part facing the outside handle arrangement, which supporting arrangement projects toward the outside handle arrangement.

16 Claims, 4 Drawing Sheets

OPENING SYSTEM FOR A MOVABLE VEHICLE BODY PART OF A MOTOR VEHICLE

BACKGROUND AND SUMMARY OF THE INVENTION

This application claims the priority of German Application 199 08 103.4, filed Feb. 25, 1999, the disclosure of which is expressly incorporated by reference herein.

The invention relates to an opening system for a movable vehicle body part of a motor vehicle having a lock which is arranged on an inner shell of the vehicle body part and can be operated by an outside handle arrangement which is fixed to an outer shell of the vehicle body part.

Such an opening system is generally known for a side door of a motor vehicle. The known motor vehicle door has an inner door shell as well as an outer door shell which are connected with one another. On a rearward frontal area of the inner door shell, a door lock is arranged which interacts with a lock shackle on the assigned door frame of the motor vehicle. The door lock can be operated from the outside by an outside handle arrangement which has a pull-type door handle, the door handle being connected with the door lock by way of a corresponding lever mechanism. The outside handle arrangement is fixed to the outer door shell. On the interior side of the outer door shell, the outside handle arrangement has a bearing part in the form of a bearing bracket which is fixed on the interior side of the outer door shell and which is disposed on the door handle arranged on the exterior side. In the event of a side impact onto the motor vehicle and onto the corresponding side door, the outer skin in the area of the outside handle arrangement may be deformed such that the lever mechanism for operating the door lock is necessarily moved, whereby an undesirable opening of the side door is caused in the event of the side impact.

It is an object of the invention to provide an opening system of the initially mentioned type which avoids an unintentional opening of the vehicle body part in the event of an impact load onto the vehicle body part.

This object is achieved in that, at the level of the outside handle arrangement on a side of the inner shell of the vehicle body part facing the outside handle arrangement, a deformation-resistant supporting block is provided which projects toward the outside handle arrangement. As the result of the providing of the deformation-resistant supporting block on the inner shell of the vehicle body part, the outer shell is deformed by a reduced amount in the area of the outside handle arrangement, since the outside handle arrangement strikes against the supporting block after a short deformation path. The deformation path, which the outside handle arrangement can cover relative to the supporting block, is advantageously of an amount which corresponds approximately to the necessary distance in the non-deformed state between the supporting block and the outside handle arrangement in order not to impair the lifting and lowering movement of a movable window of the vehicle body part. The solution according to the invention is therefore suitable particularly for motor vehicle side doors. The maximally possible deforming path for the outside handle arrangement must be selected such that the coupled lever mechanism for operating the door lock is moved only so far by the corresponding deforming movement that the door lock is not yet triggered.

As a further development of certain preferred embodiments of the invention, a bearing part of the outside handle arrangement arranged on the interior side on the outer shell is provided with a supporting element which interacts in the event of a collision with the supporting block. As the result, the maximal deformation path in the event of a corresponding impact load between the outside handle arrangement and the supporting block is reduced further because the supporting element projects toward the supporting block.

As a further development of certain preferred embodiments of the invention, the supporting block has a front-side stop face which extends diagonally downward and inward such that, in the event of a collision onto the bearing part of the outside handle arrangement and thus onto the outer shell, a movement component is exercised in the downward direction. This further development is based on the recognition that, in the event of an intrusion of the outer shell caused by a collision, the outer shell, in addition to the component caused in the collision direction, will move upward, which, in addition, may cause a triggering of the lock. Because of the described further development, the supporting block has a downwardly tilting-away angular position which generates a force and displacement component onto the outside handle arrangement in the downward direction.

As a further development of certain preferred embodiments of the invention, the stop face of the supporting block is bounded in the vertical direction of the vehicle upward by a deflecting edge which projects to the outer shell. This prevents that the section of the outside handle arrangement which comes in contact with the stop face unintentionally slides off in the upward direction.

As a further development of certain preferred embodiments of the invention, the stop face of the supporting block, on the one hand, and a face of the supporting element, on the other hand, are provided such with corresponding profilings that, in the event of a collision, the profilings form-lockingly mesh with one another. As a result, it is reliably avoided that, even in the event of high impact loads and considerable intrusions of the outer shell, the outside handle arrangement itself is displaced correspondingly extensively.

Other objects, advantages and novel features of the present invention will become apparent from the following detailed description of the invention when considered in conjunction with the accompanying drawings.

DETAILED DESCRIPTION OF THE DRAWINGS

Figure 1:
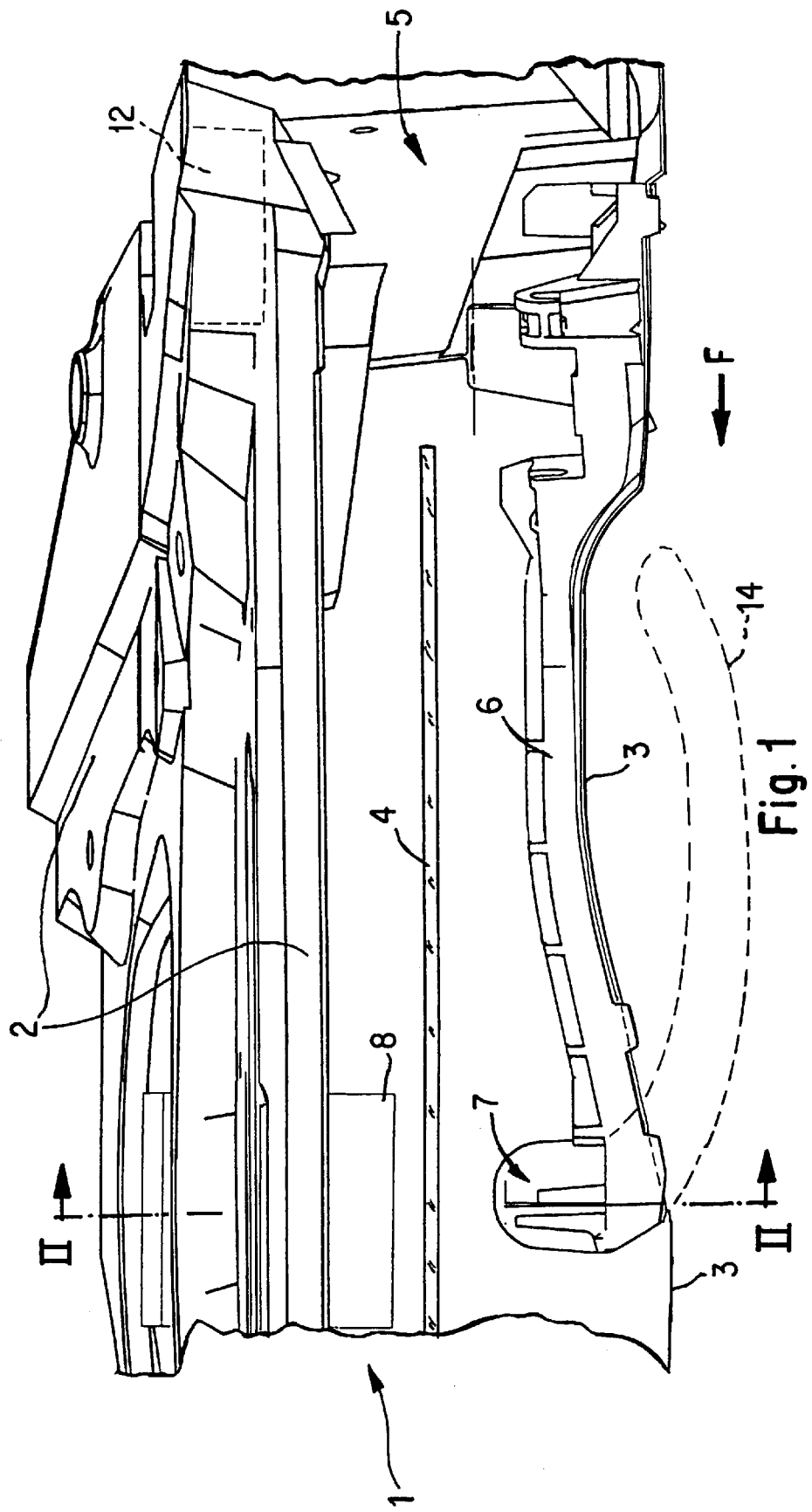
FIG. 1 is a top view of a part of a driver-side motor vehicle door for a passenger car as a shell structure; constructed according to a preferred embodiment of the invention.

As a shell-type structure, that is, without any interior trim parts, without operating assemblies and operating parts within the vehicle door, a driver-side motor vehicle door 1 preferably has an inner shell 2, which is preferably designed as a sheet metal part and which is connected in a basically known manner with an outer shell 3 which is preferably also designed as a sheet metal part and forms the exterior vehicle body skin of the vehicle door. The inner shell 2 and the outer shell 3 leave a hollow space between one another which is constructed, among other things, for a guiding arrangement, which is not shown in detail, for lifting and lowering a side window. In the area of a rearward front side 5 of the inner shell 2, a door lock 13 is positioned in a manner which is known, which door lock interacts with a lock latch or bolt on a door frame of the occupant compartment of the passenger car.

The outer shell 3 has a handle recess in which an outside handle arrangement 14 is positioned. The outside handle arrangement 14 has a swivel-type and/or pull-type door handle which is disposed on a bearing bracket 6 serving as the bearing part. The bearing bracket 6 is arranged at the level of the handle recess of the outer shell 3 on the interior side of the outer shell 3 and is fixedly connected with the outer shell 3. The door handle, which is not shown in detail, is connected by way of a lever mechanism and particularly by way of a lock operating lever with a triggering mechanism of the door lock, a pulling movement of the door handle toward the outside causing an opening of the door lock and thus an opening of the motor vehicle door when the door lock is in its unlocked condition.

Figure 2:
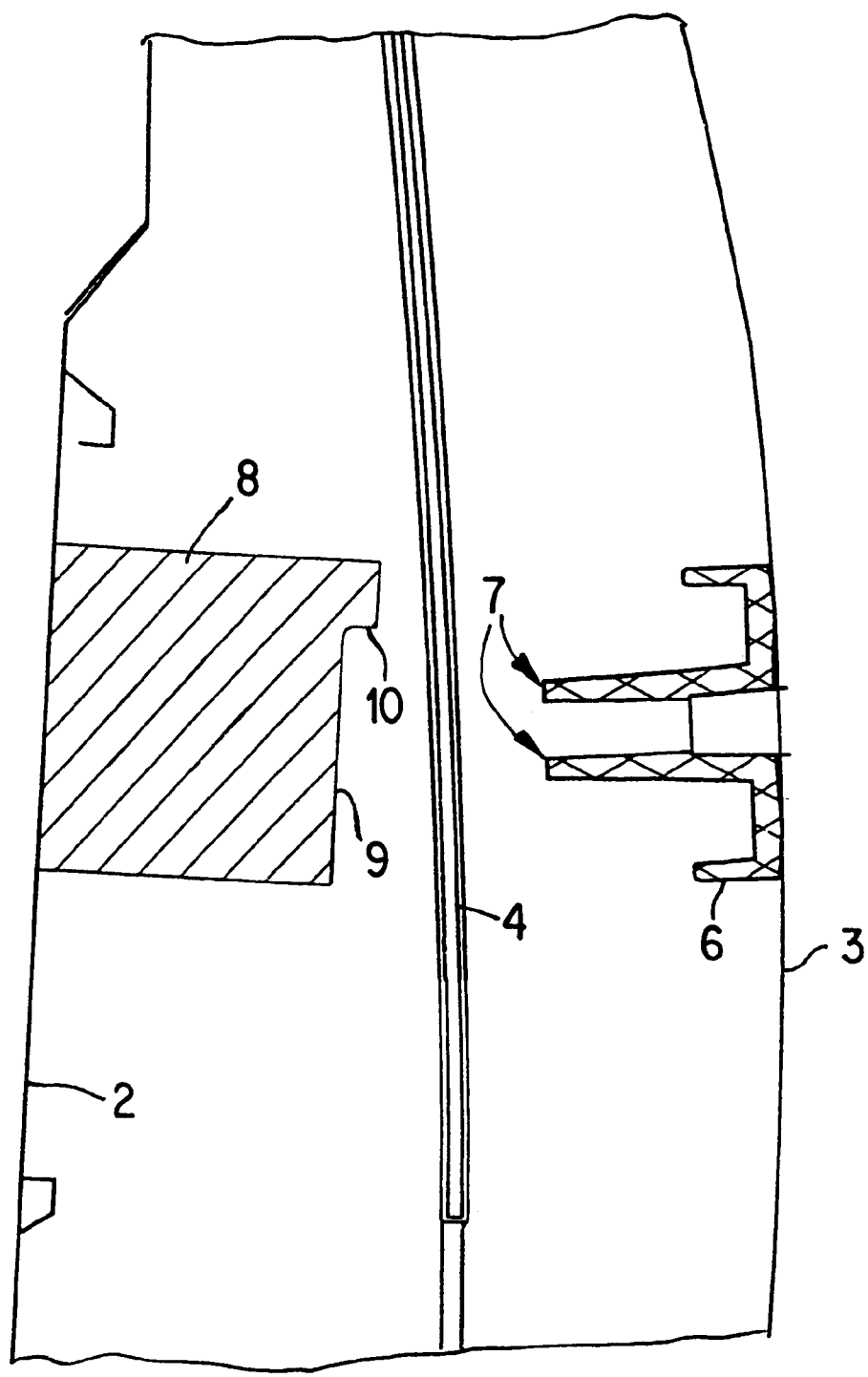
FIG. 2 is a schematic cutout-type view of the motor vehicle door according FIG. 1 at the level of the intersection Line II—II in FIG. 1.
Figure 3:
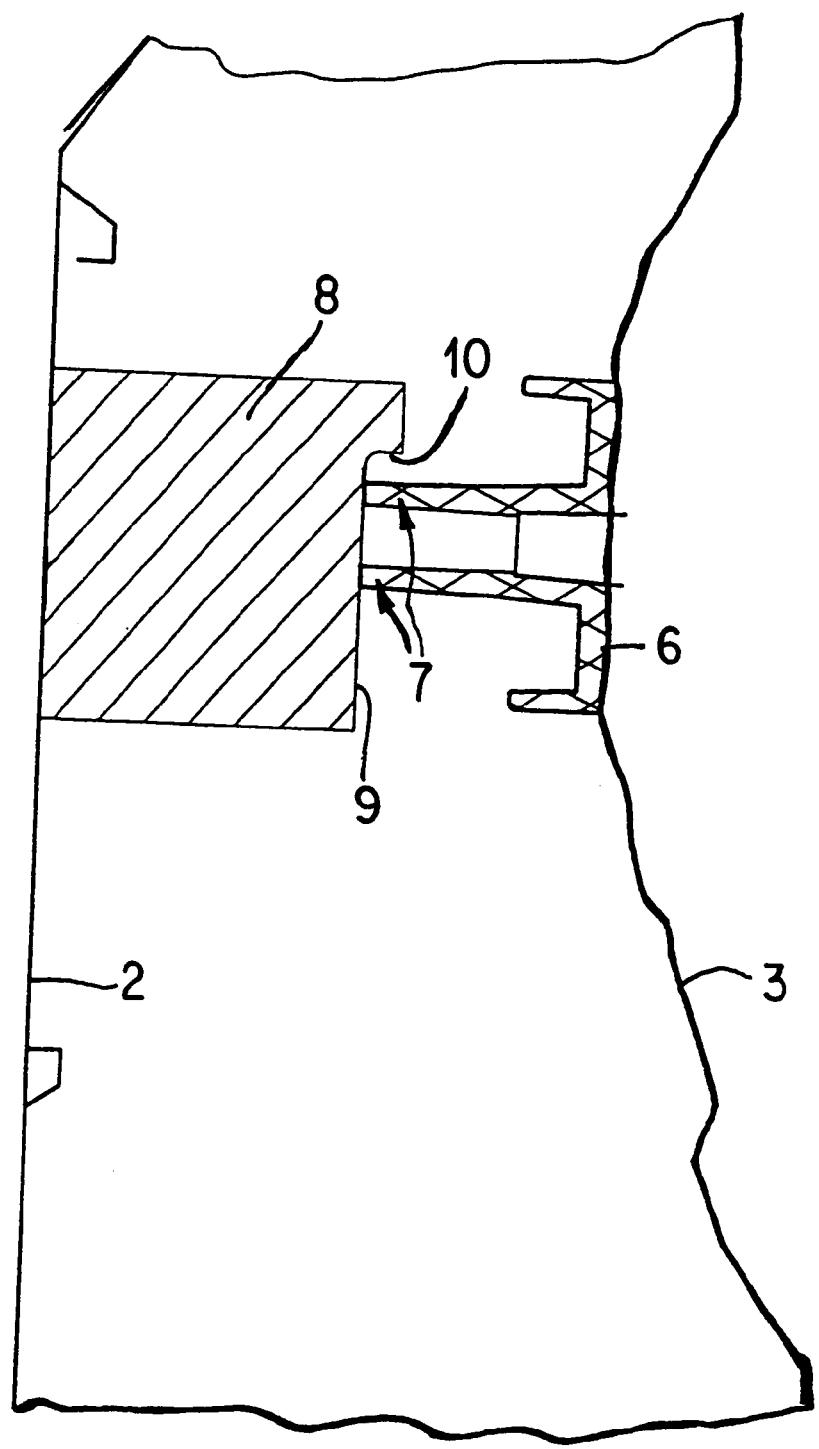
FIG. 3 is a cutout-type view of the vehicle door according to FIG. 2 shown in the deformed condition.

In order to prevent that, in the event of a side impact onto the motor vehicle door, a corresponding intrusion of the outer shell 3 leads to a considerable intrusion of the outside handle arrangement and to an unintentional transmission of the movement to the triggering mechanism of the door lock, a supporting block 8 is assigned to the outside handle arrangement and particularly the bearing bracket 6, as a supporting arrangement on the interior side of the inner shell 2. The supporting block 8 has a deformation-resistant design and, according to FIGS. 2 and 3, is supported in a stable manner on the inner shell 2. From the interior side of the inner shell 2 facing the outside, the supporting block 8 projects in the transverse direction of the vehicle toward the outer shell 3 to the outside. The supporting block 8 is positioned at the level of a corresponding supporting element 7 of the bearing bracket 6 of the outside handle arrangement, in which case the supporting element 7 is designed as a supporting extension which projects in one piece from the bearing bracket 6 approximately in the transverse direction of the vehicle toward the inside. The supporting element 7 and the supporting block 8 project toward the door center toward one another and, in the non-deformed condition of the motor vehicle door, leave a space between one another which has a sufficiently large design for the moving-through of the side window 4.

The supporting block 8 has—facing the supporting element 7 and thus the bearing bracket 6—a front-side stop face 9 which is tilted by a defined amount with respect to a vertical line, so that it is aligned diagonally downward and inward in the transverse direction of the vehicle. The stop face 9 therefore forms an inclined plane when the supporting element 7 impacts because of an intrusion of the outer shell 3 (FIG. 3), so that the correspondingly downwardly tilting angular position of the stop face 9 and of the supporting block 8 onto the supporting element 7 causes a displacement component in the vertical direction of the vehicle downward. In order to prevent that, despite the inclination of the stop face 9, the bearing bracket 6 and the supporting element 7 slide off upward, the stop face 9 is also bounded in the upward direction by a deflecting edge 10, which projects in a web-type manner from the supporting block 8 toward the outer shell 3.

The inclination of the stop face 9 and the providing of the deflecting edge 10 were provided because it was recognized that, in the event of an unhindered intrusion of the outer shell 3, the outer skin of the vehicle body, that is, the outer shell 3 including the bottom edge of the vehicle door move upward, whereby the displacement in the upward direction can also cause an extensive relative movement with respect to the door lock, which causes a triggering of the door lock. The inclined stop face 9 and the deflecting edge 10 prevent such a sliding-off in the upward direction. This reliably prevents a movement of the lock operating lever which could result in a triggering of the door lock.

Figure 4:
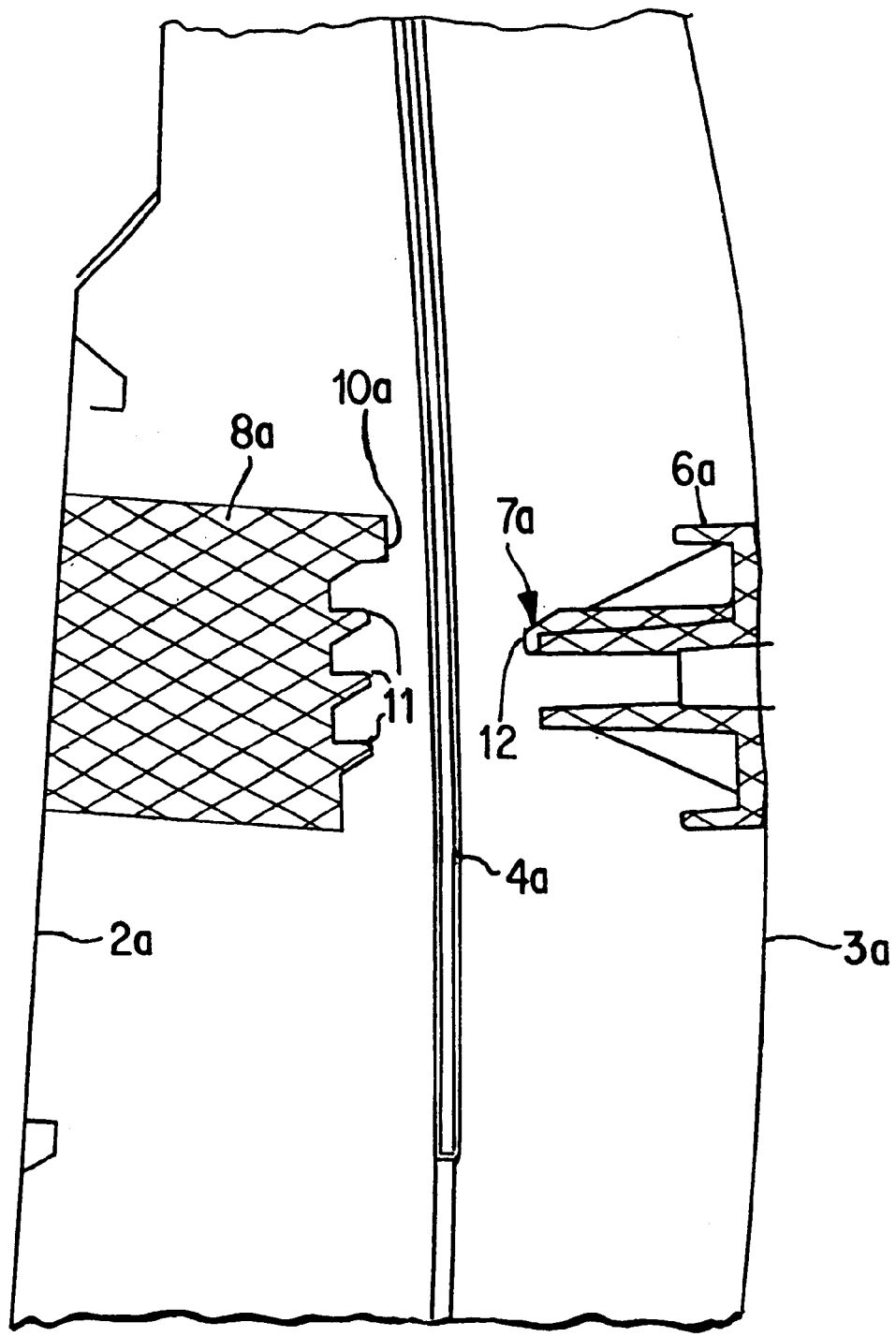
FIG. 4 is a cutout-type view of another motor vehicle door similar to FIG. 1, in the case of which the outside handle arrangement in the event of a deformation comes to rest on a profiled supporting block.

In the embodiment according to FIG. 4, a supporting block 8*a* is also provided in a vehicle side door at the level of an outside handle arrangement between an inner shell 2*a* and an outer shell 3*a*, to which supporting block 8*a* corresponding supporting element 7*a* is assigned on a bearing bracket 6*a* of the outside handle arrangement. With the exception of the differences described in the following, the supporting unit for supporting the outside handle arrangement against an excessive intrusion toward the inside corresponds to the embodiment described above by means of FIGS. 1 to 3, parts with the same function being provided with identical reference numbers with the addition of the letter "a". For a further explanation, reference is therefore also made to the description concerning the embodiment according to FIGS. 1 to 3. In the embodiment according to FIG. 4, the supporting block 8*a*, on the one hand, and the supporting element 7*a*, on the other hand, are additionally provided with profilings 11, 12 which are designed to correspond to one another such that mutually meshing toothings occur in the event of an intrusion. As the result, in the event of a corresponding intrusion, a form-locking securing of the supporting element 7*a* is achieved on the supporting block 8*a*, so that a sliding off in the upward or downward direction is no longer possible. In a supplementary manner, a deflecting edge 10*a* is additionally assigned to the tooth-type profilings 11 at the upper edge area of the supporting block 8*a* in order to prevent in every case a movement of the supporting element 7*a* and of the bearing bracket 6*a* beyond the supporting block 8*a* in the upward direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Opening system for a movable vehicle body part of a motor vehicle having a lock which is arranged on an inner shell of the vehicle body part and can be operated by an outside handle arrangement which is fixed to an outer shell of the vehicle body part, wherein at a level of the outside handle arrangement on a side of the inner shell of the vehicle body part facing the outside handle arrangement, a deformation-resistant supporting block is provided which projects toward the outside handle arrangement.

2. Opening system according to claim 1, wherein a bearing part of the outside handle arrangement arranged on an interior side on the outer shell is provided with a supporting element interacting in the event of a collision with the supporting block.

3. Opening system according to claim 2, wherein the supporting block has a front-side stop face, which is aligned diagonally in a vertically, inwardly and downwardly direction of the vehicle, in a transverse direction of the vehicle, such that, in the event of a collision, a movement component in the downward direction is exercised on the bearing part of the outside handle arrangement and thus on the outer shell.

4. Opening system according to claim 3, wherein the stop face of the supporting block is bounded in a vertical direction of the vehicle upward by a deflecting edge which projects toward the outer shell.

5. Opening system according to claim 2, wherein a stop face of the supporting block, on the one hand, and a front face of the supporting element, on the other hand, are provided with corresponding profilings such that, in the event of a collision, the profilings mesh with one another in a form-locking manner.

6. Opening system according to claim 3, wherein the stop face of the supporting block, on the one hand, and a front face of the supporting element, on the other hand, are provided with corresponding profilings such that, in the event of a collision, the profilings mesh with one another in a form-locking manner.

7. Opening system according to claim 4, wherein the stop face of the supporting block, on the one hand, and a front face of the supporting element, on the other hand, are provided with corresponding profilings such that, in the event of a collision, the profilings mesh with one another in a form-locking manner.

8. Opening system according to claim 1, wherein the supporting block has a front-side stop face.

9. Motor vehicle door having an outer shell and having an inner shell connected with the outer shell as well as having a door lock positioned in an area of the inner shell, comprising an opening system for the door lock including an outside handle arrangement which is fixed to the outer shell, wherein a deformation resistant supporting block is provided on the inner shell in a position facing and projecting toward the outside handle arrangement.

10. Motor vehicle door according to claim 9, wherein a bearing part of the outside handle arrangement arranged on an interior side on the outer shell is provided with a supporting element interacting in the event of a collision with the supporting block.

11. Motor vehicle door according to claim 10, wherein the supporting block has a front-side stop face, which is aligned diagonally in a vertically inwardly and downwardly of the vehicle in a transverse direction of the vehicle, such that, in the event of a collision, a movement component in the downward direction is exercised on the bearing part of the outside handle arrangement and thus on the outer shell.

12. Motor vehicle door according to claim 11, wherein in that the stop face of the supporting block is bounded in a vertical direction of the vehicle upward by a deflecting edge which projects toward the outer shell.

13. Motor vehicle door according to claim 10, wherein a stop face of the supporting block, on the one hand, and a front face of the supporting element, on the other hand, are provided with corresponding profilings such that, in the event of a collision, the profilings mesh with one another in a form-locking manner.

14. Motor vehicle door according to claim 11, wherein the stop face of the supporting block, on the one hand, and a front face of the supporting element, on the other hand, are provided with corresponding profilings such that, in the event of a collision, the profilings mesh with one another in a form-locking manner.

15. Motor vehicle door according to claim 12, wherein the stop face of the supporting block, on the one hand, and a front face of the supporting element, on the other hand, are provided with corresponding profilings such that, in the event of a collision, the profilings mesh with one another in a form-locking manner.

16. Motor vehicle door according to claim 9, wherein the supporting block has a front-side stop face.

\* \* \* \* \*